This invention relates generally to containers, and more particularly to a container designed for packaging delicate instruments, such as electronic equipment, to protect the same against any damage which may occur from rough handling.

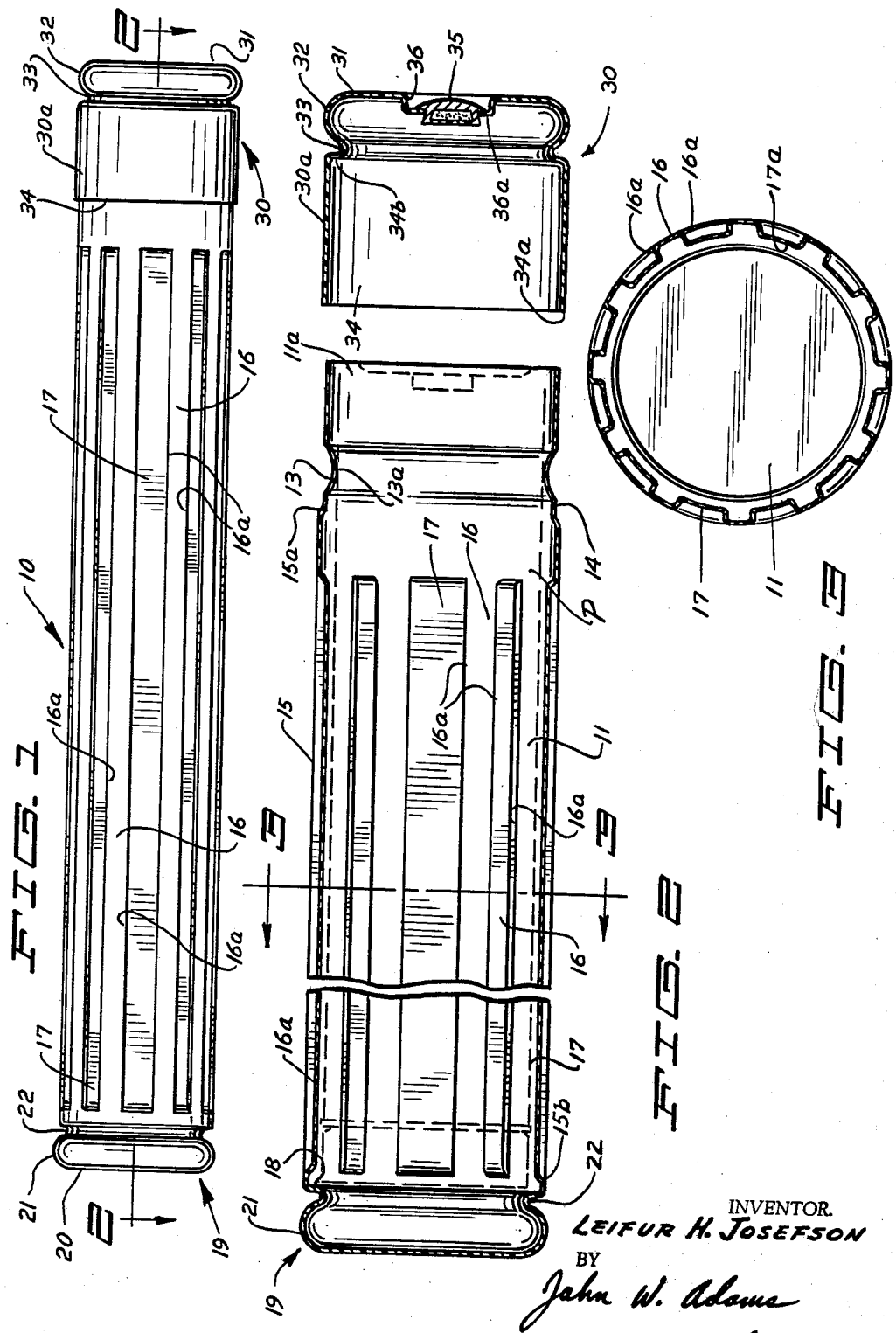
May 12, 1964 L. H. JOSEFSON 3,132,909
PLASTIC CONTAINER
Filed July 8, 1963
INVENTOR.
LEIFUR H. JOSEFSON
BY
John W. Adams
ATTORNEY 3,132,909
PLASTIC CONTAINER
Leifur H. Josefson, Hopkins, Minn., assignor to Plastison Corporation, Minneapolis, Minn., a Minnesota corporation
Filed July 8, 1963, Ser. No. 293,528
12 Claims. (Cl. 312—31.1)

It has long been a problem to package delicate instruments such that they will not be damaged during shipment or use and further to provide some way for mounting the article within the package such that sudden jolts or shocks due to rough handling will not be transmitted to and damage the instrument.

To provide a container for a delicate instrument, such as an electronic device, applicant has provided a container in which the instrument is held in stationary longitudinal and transverse position therein so as to prevent collision between the instrument and the container walls and eliminate the possibility of damage thereby. To further protect the instruments, applicant has provided a package which will absorb any shock or jolt due to handling the package no matter from what direction or what surface the shock may strike the container.

It is an object of this invention to provide an instrument-containing package having portions thereof in close fitting relation to the instrument such that the instrument will be held in stationary position therein to eliminate any damage which would normally be caused by movement of shifting of the instrument within the container.

It is a further object of this invention to provide a shock-absorbing container constructed to protect a delicate instrument carried therein from injury due to rough handling or transportation no matter from what direction the package may be jarred or struck.

It is a further specific object of this invention to provide a container having a separable body member and a closure member such that an instrument may be easily inserted therein and the closure member may be placed thereon to provide a completely enclosed shock absorbing unit and wherein portions of the body member serve to maintain the instrument within the body thus relying on the cap member for closure purposes only.

It is a further specific object of this invention to provide longitudinal shock-absorbing end portions for a container body such that should the container be dropped on one end thereof, the shock will be absorbed entirely by the end portion and will not be transmitted to the contents within the container.

It is a further specific object of this invention to provide an instrument-containing body member having rib sections thereon which are designed to absorb any jolt or shock transmitted thereto should the package be struck or fall upon its side and further to provide sufficient strength for the body in both the longitudinal and circumferential dimensions.

It is a further specific object of this invention to provide humidity indicating means and fluid absorption means within a container unit such that the amount of moisture may be controlled thereby by indicating the presence of water therein and further to absorb an amount of water or fluid that may collect within the container so as to prevent the instrument contained therein from being injured due to the moisture within the container.

These and other objects and advantages of this invention will more fully appear from the following description made in connection with the accompanying drawings, wherein like reference characters refer to the same or similar parts throughout the several views, and in which:

FIG. 1 is an elevation view showing the container in closed position;

FIG. 2 is a section view taken substantially along line 2—2 of FIG. 1 showing the container with the closure cap removed and with an instrument placed therein shown in dotted position; and FIG. 3 is a transverse section taken substantially along line 3—3 of FIG. 1.

In accordance with the accompanying drawings, an instrument container comprises a body member generally designated 10 and a closure member generally designated 30. The elements of the container 10, 30 are blow-molded from a high density polyethylene which is chosen to withstand the handling to which the container may be subjected. The body portion 10 comprises an instrument chamber defining portion 11 having sufficient longitudinal length to receive an instrument package designated P therein and is provided with access opening 11a on one end of the chamber 11 such that the instrument package P may be easily inserted therein. The other end of the chamber 11 is sealed by a shock-absorbing closure member designated 19 which will be further described hereinafter.

A reduced circumferential section 14 extends longitudinally along the chamber 11 from the access opening 11a and facilitates placement of the cap member 30 thereon in substantially telescoping relation. A depressed centering element designated 13 is spaced longitudinally from the access opening 11a on the reduced section 14 and, in the form shown, is arranged circumferentially about the chamber 11 such that the innermost portion 13a thereof will extend inwardly into the chamber 11 to contact and facilitate lateral positioning of the instrument package P contained therein. A cap abutment member 15a is arranged at the end of the reduced section 14 and serves to prevent further insertion of the container 10 into the cap member 30. A rib section generally designated 15 is provided to extend longitudinally along the container chamber 11 so as to lie intermediate the closure member 19 and the abutment shoulder 15a, as best shown in FIG. 3, the rib section 15 provides a plurality of circumferentially spaced ribs 16 and, in this form and in order to meet the necessary strength requirements, the container is provided with 12 such ribs 16 which have been found to be a sufficient number to provide the lateral strength necessary for the container. Accordingly, a series of grooves 17 are arranged intermediate each of the ribs 16 and the rib sides 16a are provided with sufficient draft such that the container 10 may be easily removed from the mold after forming. The height of the rib sides 16a in cooperation with the rib members 16 provide not only sufficient lateral and longitudinal stability to the container 10 but also provide a shock-absorbing quality which would not be attainable if the outer circumference of the container were a smooth surface.

In the form shown, the innermost sections 17a of the groove portions 17 are at a slightly larger diameter than the diameter of the instrument P and do not in normal usage contact the instrument P but rather serve to absorb any shock or jarring without transmitting the same to the instrument. The innermost end 15b of the rib section 15 is reduced in diameter such that an instrument abutting and retaining shoulder designated 18 is provided on the internal surface of the container 10 to abut with one end of the instrument P. When the instrument P abuts this shoulder 18 the other end is flush with the access opening 11a.

The shock-absorbing cap generally designated 19 is arranged adjacent to the instrument-abutting shoulder 18, and, in the form shown, comprises an end closure plate 20 connected to the abutting shoulder 18 by a pair of oppositely formed arcuate connecting portions 21 and 22 extending circumferentially around the container end 19. This end closure 19 is provided to absorb any shock or jarring which may be transmitted to the same such as by standing the container on one end or dropping the same on the end.

In the form shown the arcuate cushioning sections 21, 22 are of substantially different radii for the purposes as now set forth. By providing the cushioning sections 21, 22, applicant has, in this form, provided a pair of bellows elements mounted in series each of which has an individual spring constant. The larger radius section 21 being equal to a spring having a low spring constant and therefore being "soft" so as to absorb light shocks, while the small radius section 22 will absorb proportionately more force in deflecting and therefore be a "stiffer" spring. The reason these sections 21, 22 act as springs is, of course, the force applied thereto serves to reduce the radius of the section rather than be transmitted longitudinally to the confining chamber rib section 15. By providing these joined sections 21, 22 a jolt or shock applied to the end 19 will be absorbed thereby and not be transmitted to the contents within the container 10.

The closure cap 30 is a substantially hollow body member with one end thereof 31 closed in substantially the same manner as the shock-absorbing closure end 19 of the body unit. In this form a pair of arcuate surfaces 32—33 are arranged longitudinally along the cap adjacent the end closure plate 31 and as in the body unit are arranged in opposed relation to absorb the same type of shocks as illustrated in the above description of the body end member 19. The cap member 30 is provided with a body-receiving opening 34 on the other end thereof, the internal diameter of which is slightly larger than the reduced end portion 14 of the body member, such that it will easily be received thereover and the endmost portion 34a of the outer periphery will abut with the cap-abutting shoulder 15a of the body unit 10. An inner abutting shoulder 34b is arranged for abutting relation with the end 11a of the container 10 and will therefore also serve to abut against the end of the instrument package P which is flush with the access end 11a. The telescoping cap 30 arranged against the shoulder 15a will absorb shocks without transmitting them to the package P. The fit between the cap 30 on the body 10 will not, however, allow the members to be easily separated but, in the form shown, will separate under a force of from 5–15 lbs.

A desiccant may be inserted into the shock-absorbing end 31 of the cap 30 and a polyethylene plate (not shown) may be arranged to abut with the shoulder 34b such that when the cap is placed on the body unit, the plate will be contained between the end of the body unit and the shoulder 34b to hold the desiccant within the shock-absorbing area.

A humidity indicator, which may comprise a transparent unit 35, may be inserted into a depressed portion 36 of the closure cap 30 and may be provided with litmus paper or other such indicating means therein such that an indication may be viewed externally of the package to determine the humidity content within the package. In the form shown, the transparent container is snap-fit into an opening 36a in the reduced portion 36 of the cap 30.

To use the container the instrument P is inserted therein through the opening 11a to abut with the shoulder 18, the fit between an end plate of the package P and the rib section being such as to require pressure to force the package therethrough. The cap member 30 is then placed on the container 10 until it abuts with the shoulder 15a. Lateral shifting of the package P is prevented by the circumferential ring 13a. To prevent excessive leakage of moisture into the internal portions thereof, a tape having low moisture vapor transmission qualities may be bonded about the joint between the members. The longitudinal ribs 15 and the shock-absorbing ends 19, 31 will allow an appreciable amount of rough handling of the container and will prevent any damage of the instrument contained therein. Presence of the litmus paper and desiccant will not only serve to control the moisture content internally of the container, but will also serve to indicate the absolute moisture content therein. In this manner a completely sealed, safe, shock-absorbing unit may be provided.

It is obvious that applicant has provided a complete shock-absorbing instrument container which, with the configuration of the strengthening and shock-absorbing elements thereon, will eliminate any possibility of damage to an instrument during shipping or use thereof.

It will, of course, be understood that various changes may be made in the form, details, arrangements and proportion of parts without departing from the scope of the invention, which generally stated consists in the matter set forth in the appended claims.

What I claim is:

1. A protective container for delicate instruments and the like comprising:
   (a) a tubular body member defining an instrument-receiving chamber therein;
   (b) positioning means on one end of said chamber for abutment with and longitudinally positioning one end of an instrument;
   (c) a plurality of protective and reenforcing rib members spaced circumferentially about said body member and extending longitudinally therealong to provide lateral protection and longitudinal stability thereto;
   (d) closure means on the end of said chamber adjacent said positioning means and spaced longitudinally outwardly therefrom and being arranged and constructed for longitudinal cushioning deflection to absorb shocks caused by impact thereagainst; and
   (e) second closure means separable from said body and closing the other end of said chamber and being provided with a longitudinally deflectable cushioning portion thereon to absorb shocks caused by impact thereagainst.

2. The structure as set forth in claim 1 wherein the transverse diameter of said body member is slightly larger than the diameter of the instrument to be received therein and is provided with centering means arranged on the inner surface thereof to provide the sole means of supporting an instrument against lateral movement therewithin.

3. The structure set forth in claim 2 wherein said body and separable cover means are formed from a resilient plastic material.

4. The structure set forth in claim 1 wherein the longitudinal deflectable shock absorbing means on said chamber and closure member comprise a pair of longitudinally adjacent arcuately formed sections arranged circumferentially about the body member and cover member.

5. The structure set forth in claim 4 wherein said adjacent arcuate surfaces are disposed in generally opposed relation such that one of said sections is arranged concavely to the chamber and the other is arranged in convex relation thereto.

6. The structure set forth in claim 5 wherein the radius of one arcuate ring section is substantially greater than the radius of the other such that the ring sections will deflect longitudinally under substantially different amounts of force applied thereto.

7. The structure set forth in claim 6 wherein the section having the larger radius is spaced longitudinally from the confining chamber and the section comprising the smaller radius portion is arranged therebetween.

8. The structure set forth in claim 1 wherein moisture absorbing means are arranged within one of said longitudinally deflectable ends.

9. The structure set forth in claim 1 wherein a humidity detecting element is arranged within one end of said container.

10. The structure set forth in claim 2 wherein air circulation means are provided in said body member to facilitate air travel from one end thereof to the other end.

11. A protective container for delicate instruments and the like comprising:
   (a) a tubular body member defining an instrument-receiving chamber therein with means for providing longitudinal stability thereto;
   (b) positioning means on one end of said chamber for abutment with and longitudinally positioning one end of an instrument;
   (c) means for providing lateral protection for an instrument received in said chamber;
   (d) closure means on the end of said chamber adjacent said positioning means and spaced longitudinally outwardly therefrom and being arranged and constructed for longitudinal cushioning deflection to absorb shocks caused by impact thereagainst; and
   (e) second closure means separable from said body and closing the other end of said chamber and being provided with a longitudinally deflectable cushioning portion thereon to absorb shocks caused by impact thereagainst.

12. A protective container for delicate instruments and the like comprising:
   (a) a tubular body member defining an instrument-receiving chamber therein;
   (b) positioning means on one end of said chamber for abutment with and longitudinally positioning one end of an instrument;
   (c) means for providing lateral protection for an instrument received in said chamber;
   (d) closure means on the end of said chamber adjacent said positioning means and spaced longitudinally outward therefrom;
   (e) a pair of longitudinally deflectable cushioning ring sections intermediate said closure means and said positioning means having
      (i) arcuate surfaces arranged in generally opposed relation to said chamber and
      (ii) the radius of the arcuate surface of one ring section being substantially greater than the other ring section;
   (f) second closure means separable from said body and closing the other end of said chamber having
      (i) a pair of longitudinally deflectable arcuate surfaces arranged in generally opposed relation to said chamber and
      (ii) the radius of the arcuate surface of one ring section being substantially greater than the other ring section.

References Cited in the file of this patent
UNITED STATES PATENTS
3,044,608    Bachleder et al. _____ July 17, 1962